United States Patent
Oral et al.

(10) Patent No.: US 11,667,762 B2
(45) Date of Patent: Jun. 6, 2023

(54) UV-INITIATED REACTIONS IN POLYMERIC MATERIALS

(71) Applicant: THE GENERAL HOSPITAL CORPORATION, Boston, MA (US)

(72) Inventors: Ebru Oral, Newton, MA (US); Ayse Bakar Atici, Boston, MA (US); Ali Eren Atici, Boston, MA (US); Orhun K. Muratoglu, Cambridge, MA (US)

(73) Assignee: The General Hospital Corporation, Boston, MA (US)

( * ) Notice: Subject to any disclaimer, the term of this patent is extended or adjusted under 35 U.S.C. 154(b) by 154 days.

(21) Appl. No.: 16/635,105

(22) PCT Filed: Aug. 28, 2018

(86) PCT No.: PCT/US2018/048256
§ 371 (c)(1),
(2) Date: Jan. 29, 2020

(87) PCT Pub. No.: WO2019/046243
PCT Pub. Date: Mar. 7, 2019

(65) Prior Publication Data
US 2021/0395472 A1   Dec. 23, 2021

Related U.S. Application Data

(60) Provisional application No. 62/551,440, filed on Aug. 29, 2017.

(51) Int. Cl.
| | |
|---|---|
| *C08F 2/46* | (2006.01) |
| *C08F 2/50* | (2006.01) |
| *C08G 61/04* | (2006.01) |
| *C08J 3/28* | (2006.01) |
| *C08F 2/48* | (2006.01) |
| *C08F 220/20* | (2006.01) |
| *C08F 255/02* | (2006.01) |
| *C08J 3/24* | (2006.01) |
| *C08K 5/132* | (2006.01) |
| *C08L 23/06* | (2006.01) |

(52) U.S. Cl.
CPC .......... *C08J 3/28* (2013.01); *C08F 2/48* (2013.01); *C08F 220/20* (2013.01); *C08F 255/02* (2013.01); *C08J 3/24* (2013.01); *C08K 5/132* (2013.01); *C08L 23/06* (2013.01); *C08J 2323/06* (2013.01); *C08L 2207/068* (2013.01); *C08L 2312/06* (2013.01)

(58) Field of Classification Search
CPC .... C08K 5/132; C08K 5/0025; C08K 5/1545; C08K 5/07; C08J 3/28; C08J 3/24; C08J 3/128; C08J 7/123; C08J 2323/06; C08F 255/02; C08F 2/48; C08F 220/20; C08L 23/06; C08L 51/06; C08L 2312/06; C08L 2207/068

USPC .......... 522/46, 33, 6, 189, 184, 71, 1; 520/1
See application file for complete search history.

(56) References Cited

U.S. PATENT DOCUMENTS

| | | |
|---|---|---|
| 3,974,132 A | 8/1976 | Valdiserri |
| 5,032,450 A | 7/1991 | Rechlicz et al. |
| 5,096,654 A | 3/1992 | Craggs et al. |
| 5,410,016 A | 4/1995 | Hubbell et al. |
| 5,827,904 A | 10/1998 | Hahn |
| 5,879,400 A | 3/1999 | Merrill et al. |
| 6,165,220 A | 12/2000 | McKellop et al. |
| 6,316,158 B1 | 11/2001 | Saum et al. |
| 6,448,315 B1 | 9/2002 | Lidgren et al. |
| 6,521,284 B1 | 2/2003 | Parsons et al. |
| 6,641,617 B1 | 11/2003 | Merrill et al. |
| 6,852,772 B2 | 2/2005 | Muratoglu et al. |
| 7,205,339 B2 | 4/2007 | Muratoglu |
| 7,381,752 B2 | 6/2008 | Guard et al. |
| 7,431,874 B2 | 10/2008 | Muratoglu et al. |
| 7,790,779 B2 | 9/2010 | Muratoglu |
| 7,833,452 B2 | 11/2010 | Muratoglu et al. |
| 7,858,671 B2 | 12/2010 | Merrill et al. |
| 8,420,000 B2 | 4/2013 | Muratoglu et al. |
| 8,425,815 B2 | 4/2013 | Muratoglu et al. |
| 8,461,225 B2 | 6/2013 | Muratoglu et al. |
| 8,529,937 B2 | 9/2013 | Brunner et al. |
| 8,530,057 B2 | 9/2013 | Muratoglu et al. |
| 8,569,395 B2 | 10/2013 | Muratoglu et al. |
| 8,858,979 B1 | 10/2014 | DesJardins et al. |

(Continued)

FOREIGN PATENT DOCUMENTS

| | | |
|---|---|---|
| EP | 1457172 A1 | 9/2004 |
| EP | 0881919 B1 | 8/2005 |

(Continued)

OTHER PUBLICATIONS

Chen et al., Photocrosslinking of polyethylene. I. Photoinitiators, Crosslinking Agent, and Reaction Kinetics, Nov. 27, 1989, Journal of Polymer Science Part A: Polymer Chemistry Edition, No. 12, 4051-4075 (Year: 1989).*

(Continued)

*Primary Examiner* — Jessica Whiteley
(74) *Attorney, Agent, or Firm* — McCarter & English, LLP

(57) ABSTRACT

Methods of making crosslinked polymeric materials and crosslinked interlocked hybrid polymeric materials using photoinitiator, antioxidant, additive, and photoirradiation of polymeric blend and/or interlocked hybrid materials are provided. Methods of spatially controlling macroscopic properties and morphology of polymeric materials, and products made by the methods also are provided.

7 Claims, 5 Drawing Sheets

(56) References Cited

U.S. PATENT DOCUMENTS

| | | |
|---|---|---|
| 8,933,145 B2 | 1/2015 | Oral et al. |
| 9,273,189 B2 | 3/2016 | Muratoglu et al. |
| 9,370,878 B2 | 6/2016 | Muratoglu et al. |
| 9,433,705 B2 | 9/2016 | Muratoglu et al. |
| 9,681,683 B2 | 6/2017 | Esposti et al. |
| 9,731,047 B2 | 8/2017 | Oral et al. |
| 10,220,547 B2 | 3/2019 | Muratoglu et al. |
| 2002/0064653 A1* | 5/2002 | Ladika ............... C08L 23/0815 428/375 |
| 2004/0091462 A1 | 5/2004 | Lin et al. |
| 2004/0156879 A1 | 8/2004 | Muratoglu |
| 2005/0090571 A1 | 4/2005 | Mehta et al. |
| 2006/0064653 A1 | 3/2006 | Zhang et al. |
| 2007/0059334 A1 | 3/2007 | Abt et al. |
| 2007/0114702 A1 | 5/2007 | Muratoglu et al. |
| 2007/0213835 A1 | 9/2007 | Wimmer et al. |
| 2007/0265369 A1 | 11/2007 | Muratoglu |
| 2007/0267030 A1 | 11/2007 | Muratoglu et al. |
| 2008/0215142 A1 | 9/2008 | Muratoglu et al. |
| 2008/0319137 A1 | 12/2008 | Rufner et al. |
| 2009/0030524 A1 | 1/2009 | Schroeder et al. |
| 2009/0181253 A1 | 7/2009 | Michalik et al. |
| 2009/0243159 A1 | 10/2009 | Sun |
| 2010/0190882 A1 | 7/2010 | Muratoglu et al. |
| 2010/0292374 A1 | 11/2010 | Bellare |
| 2011/0039014 A1 | 2/2011 | King et al. |
| 2011/0040381 A1 | 2/2011 | Kidd et al. |
| 2011/0070454 A1 | 3/2011 | Gregg et al. |
| 2012/0041094 A1 | 2/2012 | Oral |
| 2012/0046380 A1 | 2/2012 | Morrison et al. |
| 2012/0267819 A1 | 10/2012 | Freedman |
| 2013/0203885 A1 | 8/2013 | Muratoglu et al. |
| 2014/0098001 A1 | 4/2014 | Van Oosterbosch et al. |
| 2015/0151866 A1 | 6/2015 | Oral |
| 2015/0190545 A1 | 7/2015 | Oral |
| 2015/0314038 A1 | 11/2015 | Oral et al. |
| 2016/0215117 A1 | 7/2016 | Muratoglu |
| 2016/0250779 A1 | 9/2016 | Muratoglu |
| 2017/0114193 A1* | 4/2017 | Ericsson ............... C08J 3/24 |
| 2017/0137603 A1 | 5/2017 | Morrison et al. |
| 2017/0259467 A1 | 9/2017 | Muratoglu et al. |
| 2019/0134273 A1 | 5/2019 | Oral et al. |
| 2019/0255744 A1 | 8/2019 | Muratoglu et al. |

FOREIGN PATENT DOCUMENTS

| | | |
|---|---|---|
| EP | 1779877 A1 | 5/2007 |
| EP | 2384774 A2 | 11/2011 |
| WO | 1997029793 A1 | 8/1997 |
| WO | 1999029793 A1 | 6/1999 |
| WO | 2001005337 A1 | 1/2001 |
| WO | 2001080778 A1 | 11/2001 |
| WO | 2002048259 A2 | 6/2002 |
| WO | 2005074619 A2 | 8/2005 |
| WO | 2005110276 A1 | 11/2005 |
| WO | 2006026040 A1 | 3/2006 |
| WO | 2007024684 A2 | 3/2007 |
| WO | 2007024689 A2 | 3/2007 |
| WO | 2008092047 A1 | 7/2008 |
| WO | 2010096771 A2 | 8/2010 |
| WO | 2013151960 A2 | 10/2013 |
| WO | 2015057943 A2 | 4/2015 |
| WO | 2017/136726 A1 | 8/2017 |
| WO | 2017192347 A1 | 11/2017 |
| WO | 2019046243 A2 | 3/2019 |

OTHER PUBLICATIONS

Fang et al. "Processing and mechanical properties of HA/UHMWPE nanocomposite" 2006, Biomaterials 27:3701-3707.

Atkinson et al. "Materials for Internal Prostheses: The Present Position and Possible Future Developments" 1980, Biomaterials 1(2):89-99 (abstract only).

Chen et al. "Photocrosslinking of Polyethylene. OI. Photoinitiatiators, Crosslinking Agent, and Reaction Kinetics" Nov. 1989, J. Polymer Science, Polymer Chemistry Ed. Interscience Publishers, NY NY, 27(12):4051-4075.

Costa et al. Mechanism of Crosslinking and Oxidative Degradation UHMWPE handbook.

Evaluation of cross-linked UHMWPE with regards to its suitability as implant material for hip joint shells, pp. 1-91, Technical Univ. of Berlin, Plastics Research (Nov. 2003) (German) translation).

Evaluation of cross-linked UHMWPE with regards to its suitability as implant material for hip joint shells, pp. 1-91, Technical Univ. of Berlin, PlasticsResearch (Nov. 2003) (English translation).

International Search Report and Written Opinion for PCT/US2010/024935 dated Sep. 27, 2010.

International Search Report and Written Opinion for PCT/US2013/034887 dated Aug. 6, 2013.

International Search Report and Written Opinion for PCT/US2014/060865 dated Mar. 13, 2015.

International Search Report and Written Opinion for PCT/US2018/048256 dated Mar. 13, 2019.

IRGANOX 1010, Phenolic Primary Antioxidant for Processing and Long-Term Thermal Stabilization, Ciba Specialty Chemicals, Inc. (Aug. 1998).

Kurtz "Chapter 16, Vitamin-E Blended UHMWPE Biomaterials" 2005, UHMWPE Handbook: Ultra high molecular weight polyethylene in total joint, vol. 11:235-250 (abstract only).

Morshedian et al. "Polyethylene Cross-Linking by Two=Step Silane Method: A Review" 2009, Iranian Polymer Journal 18(2):103-128.

Oral et al. "A Surface Crosslinked UHMWPE Stabilized by Vitamin E With Low Wear and High Fatigue Strength" 2010, Biomaterials 31(27):7051-7060.

Oral et al. "Peroxide Cross-Linked UHMWPE Blended with Vitamin E" 2016, J. Biomed. Mater. Res., Part B 105(6):1379-1389.

Lin-Gibson et al., Synthesis and characterization of PEG dimethacrylates and their hydrogels. Biomacromolecules. Jul.-Aug. 2004;5(4):1280-7.

Sosnik et al., Microwave-assisted polymer synthesis (MAPS) as a tool in biomaterials science: How new and how powerful. Progress in Polymer Science. 2011;36(8):1050-78.

Zhang et al., Microwave-Assisted Synthesis of PLLA-PEG-PLLA Triblock Copolymers. Macromolecular Rapid Communications. Feb. 2007;28(4):422-7.

International Search Report and Written Opinion for Application No. PCT/US2021/016475, dated May 24, 2021, 7 pages.

International Preliminary Report on Patentability for Application No. PCT/US2021/016475, dated Aug. 18, 2022, 7 pages.

* cited by examiner

Figure 1. XLD of the samples as a function of UV initiator concentration and irradiation time.
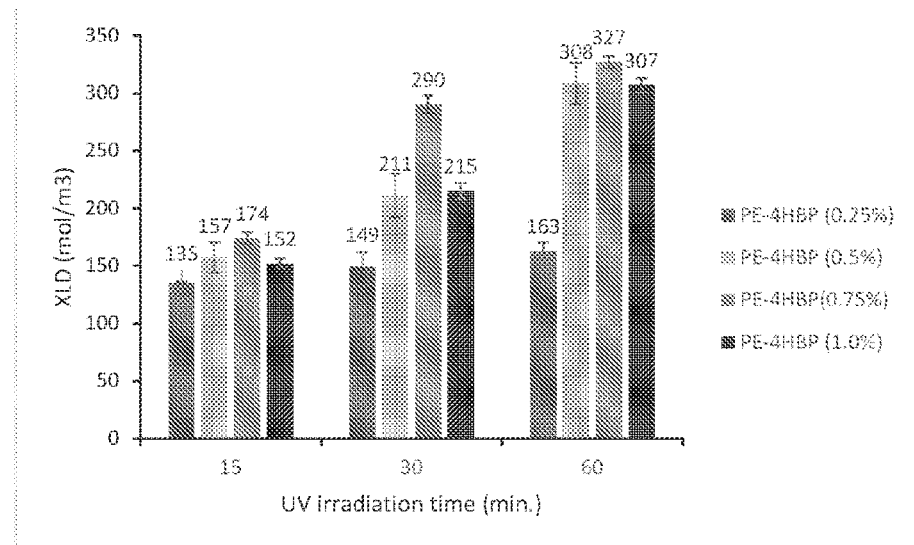
Figure 2. XLD of the samples (PE-4HBP (0.5 wt%)) as a function of irradiation time.
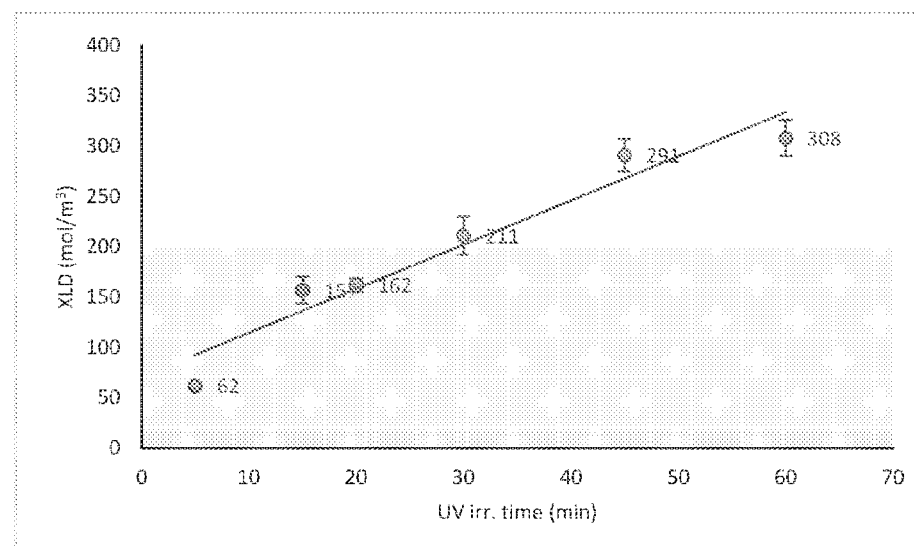

Figure 3. XLD of the vitamin E blended samples (PE (1.0 wt% Vit. E)-4-HBP (0.5 wt%)) as a function of irradiation time.
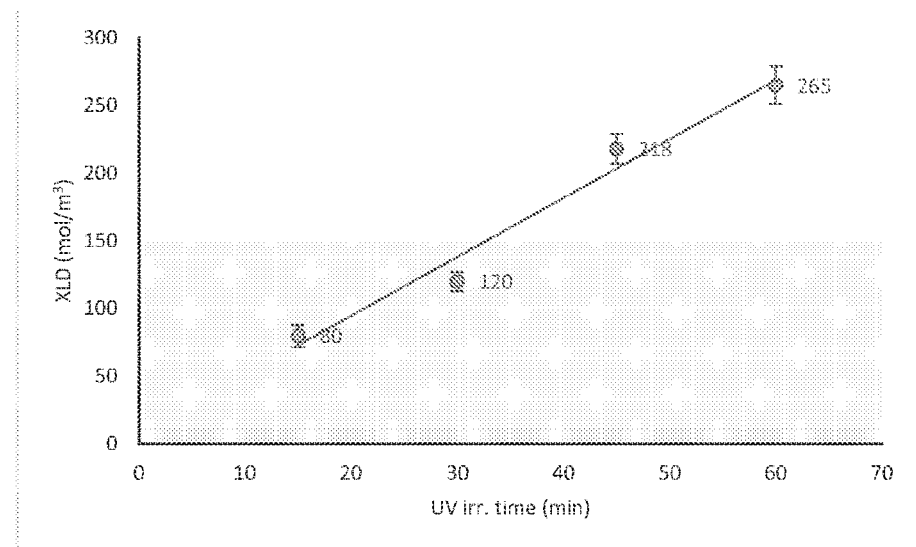
Figure 4. XLD of the PE-4-HBP(0.5 wt%) samples as a function of vitamin E concentration.
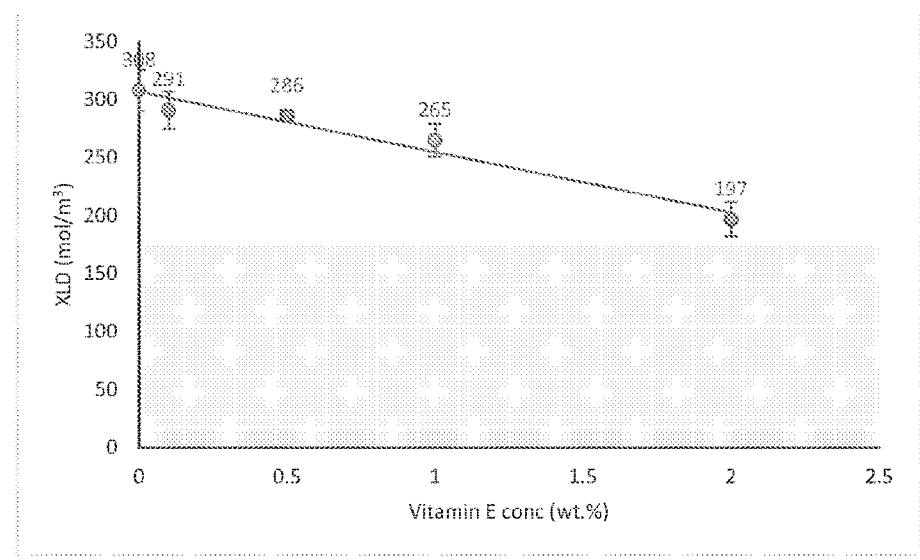

Figure 5. The pin on disk wear rates of PE-4-HBP samples as a function of UV initiator concentration.
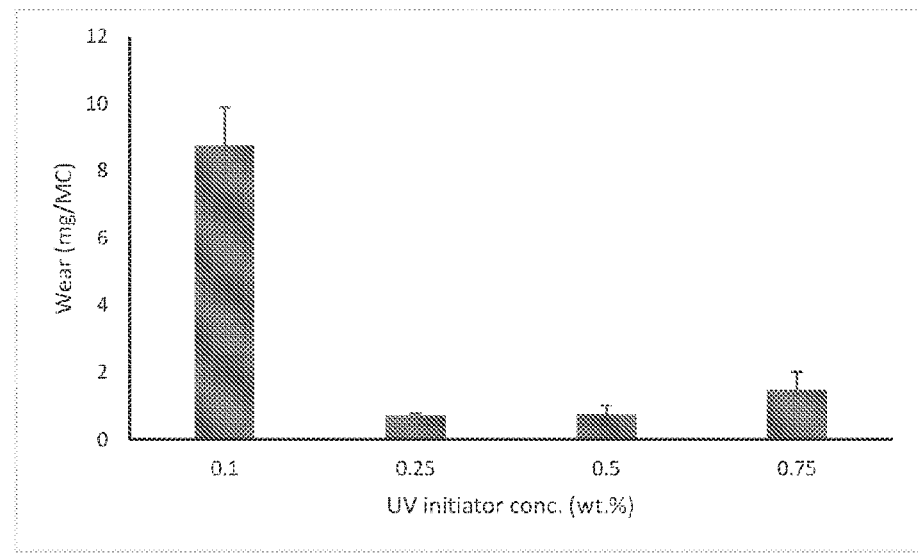
Figure 6. The pin on disk wear rates of PE-4HBP (0.5 wt%) as a function of UV irradiation time.
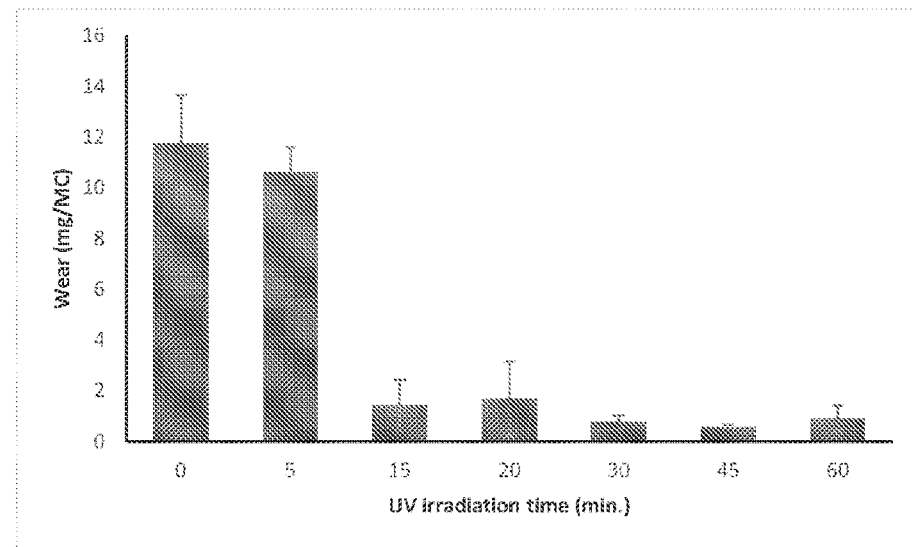

Figure 7. The pin on disk wear rates of 1.0 wt% vitamin-E blended samples as a function of UV irradiation time.
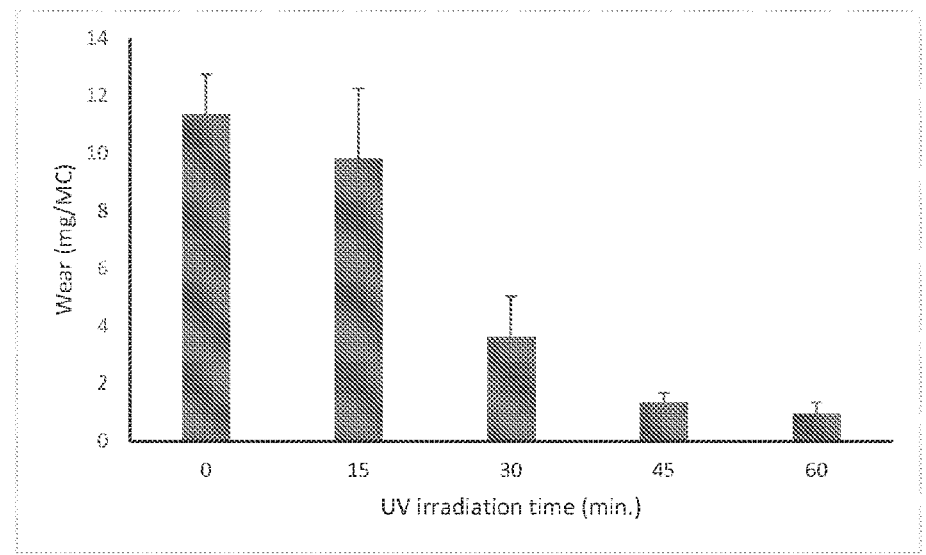
Figure 8. The pin on disk wear rates of virgin samples (4-HBP (0.5 wt%) as a function of vitamin- E concentration for 30 minutes irradiated.
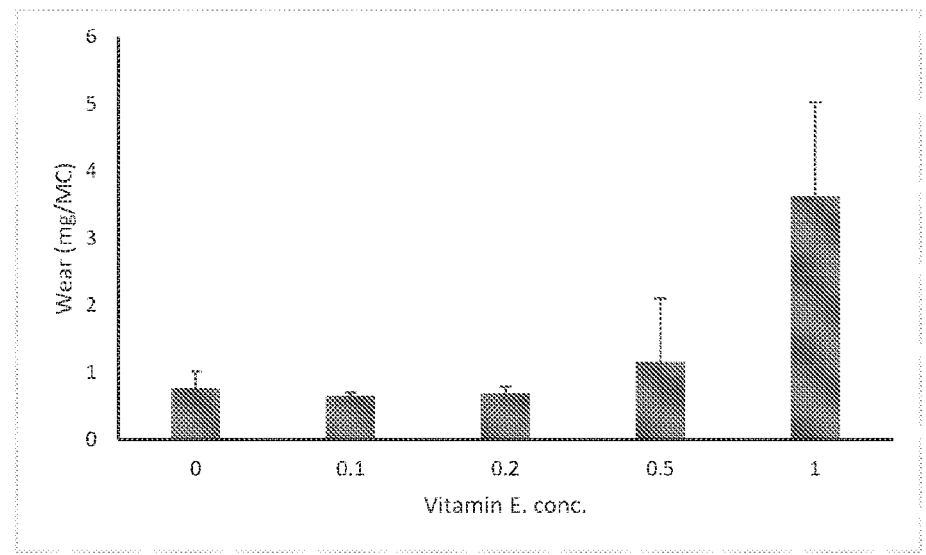

Figure 9. The pin on disk wear rates of virgin samples (4-HBP (0.5 wt%)) as a function of vitamin- E concentration for 1 hour irradiated.
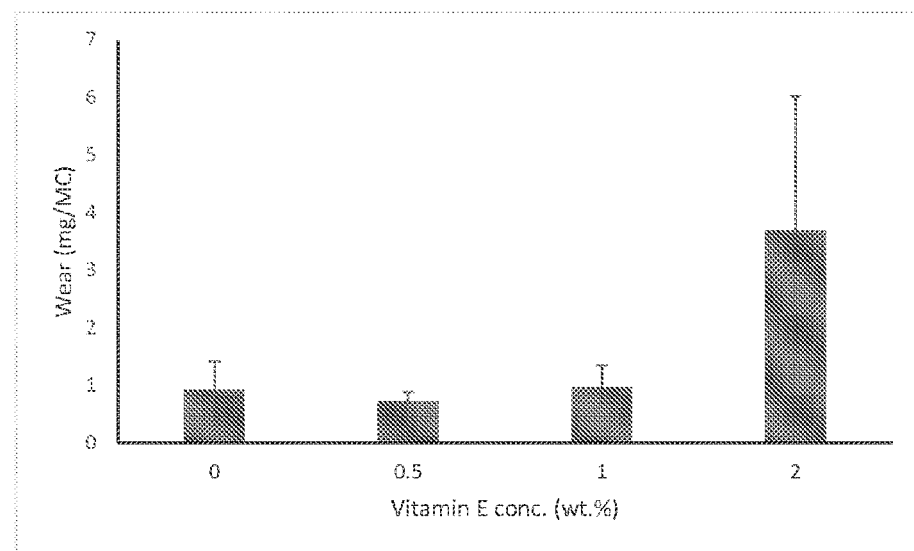

UV-INITIATED REACTIONS IN POLYMERIC MATERIALS

This application is a 371 of PCT/US2018/048256, filed Aug. 28, 2018, which claims priority to U.S. Patent Application No. 62/551,440, filed Aug. 29, 2017, each of which are hereby incorporated by reference.

FIELD OF THE INVENTION

The present invention relates to methods for initiation of reactions to cross-link polymeric materials using modifications initiated by ultraviolet irradiation. Methods of spatially controlling macroscopic properties and morphology of cross-linked polymeric materials are also provided.

BACKGROUND OF THE INVENTION

Ultrahigh molecular weight polyethylene (UHMWPE) has been used as a standard polymeric material in total joint arthroplasty (Kurtz S. M., UHMWPE Biomaterials Handbook. Elsevier; Amsterdam, The Netherlands: 2016, The Origins of UHMWPE in Total Hip Arthroplasty; 33-44) due to its excellent mechanical strength, fatigue resistance and ductility. Different strategies such as radiation cross-linking have been applied to improve the wear resistance of UHMWPE implant materials. Highly cross-linked UHMWPEs which have been exposed to high dose (>40 kGy) radiation have been in clinical use in total joint arthroplasty for approximately the last two decades. High energy ionizing radiation (gamma or e-beam) is extensively used in the fabrication of highly crosslinked UHMWPE implants. However, the critical disadvantages of high energy radiation is its adverse effects on mechanical properties (Costa L., Bracco P., Mechanism of crosslinking and oxidative degradation of UHMWPE. In: Kurtz S M (ed.) The UHMWPE handbook: ultra-high molecular weight polyethylene in total joint replacement, vol 11. Academic, New York, 2004, 235-250) and its high cost. Chemical crosslinking of UHMWPE using silane chemistry (Atkinson, J. R., Dowling, J. M., Cicek, R. Z., Materials for internal prostheses: the present position and possible future developments, Biomaterials, 1980, 1, 2, 89-99) or peroxide compounds (Oral et al., J. Biomed Mater Res Part B, 2017, 105B, 1379-1389) has also been reported in literature. However, the number of patients are very small and there is little information about the clinical outcomes of implant materials prepared by using these methods.

All clinically available radiation cross-linked material seek to obtain uniform crosslinking of the material. It has been shown that when cross-linking is limited to the surface of the implant materials, the fatigue resistance can be largely improved and some methods of limiting crosslinking to the surface have been published (Oral, E., Rowell, S. L., Micheli, B. R., Lozynsky, A. J., Muratoglu, O. K., A surface crosslinked UHMWPE stabilized by vitamin E with low wear and high fatigue strength, Biomaterials, 2010, 31, 27, 7051-7060). Such limitation can be achieved by using photo-initiated cross-linking of implant surfaces made of polymeric material. In this invention, methods of photo-crosslinking of UHMWPE using blended and diffused initiators such as 4-hydroxybenzophenone (4-HBP) are described. In addition, modification of polymeric material before and after consolidation into solid forms by photografting of hydrophilic and amphiphilic polymers using photoinitiators and photo-irradiation are described. Photo-crosslinking has additional advantages including ease of use, processing of near-net shape implants, in situ modification in the operating room, lower polymeric degradation.

SUMMARY OF THE INVENTION

In some embodiments, blending the polymeric material with one or more photoinitiators before exposure to light for modification are described. In other embodiments, the polymeric material can be coated with initiator before exposure to light for modification. The exposure to light can be used once or multiple times during a described method.

In some embodiments, a polymeric material is blended with one or more photoinitiators. The blended polymeric material can be blended with antioxidants and/or other additives simultaneously or using separate blending procedures. The blended polymeric material can be consolidated into solid forms. These solid forms can be directly formed in a desired shape or can be fashioned into a desired shape after consolidation using a method such as machining. The blended, consolidated polymeric material can be exposed to photo irradiation.

In an embodiment, a method of making a crosslinked polymeric material is described comprising blending a polymeric material with a photoinitiator, consolidating the polymeric material, exposing the photoinitiator-blended, consolidated polymeric material to light. In any embodiment, the provided polymeric material can be blended with another additive and/or an antioxidant.

In an embodiment, a method of making a crosslinked polymeric material is described comprising blending a polymeric material with at least one photoinitiator, layering the photoinitiator-blended polymeric material with polymeric material without photoinitiator, consolidating the layered, photoinitiator-blended polymeric material, exposing the photoinitiator-blended, consolidated layered polymeric material to light. In this embodiment, the surfaces of the photoinitiator-blended polymeric material are exposed to light.

In an embodiment, a method of making a crosslinked polymeric material is described comprising blending a polymeric material with at least one photoinitiator and at least one antioxidant, consolidating the blended polymeric material, exposing the photoinitiator and antioxidant-blended, consolidated polymeric material to light.

In an embodiment, a method of making a crosslinked polymeric material is described comprising blending a polymeric material with at least one photoinitiator and at least one antioxidant, layering the photoinitiator-blended polymeric material with polymeric material with antioxidant but without photoinitiator, consolidating the layered, photoinitiator-blended polymeric material, exposing the photoinitiator-blended, consolidated layered polymeric material to light. In this embodiment, the surfaces of the photoinitiator-blended polymeric material are exposed to light.

In an embodiment, a method of making a crosslinked polymeric material is described comprising providing a polymeric material, consolidating the polymeric material, diffusing at least one photoinitiator into the polymeric material, exposing the photoinitiator-diffused polymeric material to photoirradiation.

In an embodiment, a method of making a crosslinked polymeric material is described comprising providing an antioxidant-blended polymeric material, consolidating the antioxidant-blended polymeric material, diffusing at least one photoinitiator into the consolidated, antioxidant-blended polymeric material, exposing the photoinitiator-diffused polymeric material to photoirradiation.

In some embodiments, a polymeric material is provided, blended with at least one photoinitiator, exposed to photoirradiation and consolidated.

In an embodiment, a method of making a partly crosslinked polymeric material is described comprising providing a polymeric material, blending the polymeric material with at least one photoinitiator, exposing the blended polymeric material to photoirradiation, consolidating the photoirradiated polymeric material.

In an embodiment, a method of making a partly crosslinked polymeric material is described comprising providing a polymeric material, coating the polymeric material with at least one photoinitiator, exposing the blended polymeric material to photoirradiation, consolidating the photoirradiated polymeric material.

The blending of any of the components can be done with the aid of a solvent or liquid environment. The components can be insoluble, partially soluble or soluble in the solvents or mediums used to aid blending. The solvents can contain components other than photoinitiators such as antioxidants, monomers, macromers, oligomers, polymers, emulsifiers. The solvents can be aqueous or organic-based or a mixture thereof.

In some embodiments, the intensity of the photoirradiation is dependent on the distance of the exposed parts of the polymeric material from the light source. The distance from the light source can be fixed or mobile and can be modified as desired to obtain the desired cross-link density on the exposed parts of the polymeric material. It can also be modified to obtain the desired crosslinking profile as a function of depth in the polymeric material. Alternately, some part of the polymeric material can be shielded during irradiation to prevent crosslinking in these regions. In this manner, crosslinking can be spatially controlled.

In any of the embodiments, an antioxidant can be vitamin E. The concentration of vitamin E in at least one part of the polymeric material can be from 0.0001 wt % to 99 wt % of the polymeric material, or from 0.01 wt % to 5.0 wt %, or from 0.1 wt % to 1.0 wt %, more preferable about 0.2 wt %.

In any of the embodiments, the concentration of photoinitiator can be from 0.0001 wt % to 99 wt % of the polymeric material, or from 0.01 wt % to 5.0 wt %, or from 0.1 wt % to 1.0 wt %, more preferable about 0.5 wt %.

In any of the embodiments, the polymeric materials can be exposed to photoirradiation for at least 0.1 seconds to 48 hours, or from 10 seconds to 6 hours, or from 30 seconds to 2 hours, more preferably 1, 5, 10, 20 or 30 minutes.

In any of the embodiments, the polymeric material can be exposed to photoirradiation in a primarily gas, liquid, solid or supercritical fluid medium. Exposure to photoirradiation can be done when the polymeric material is in air, in an inert gas, a liquid, an emulsion, a solution, a slurry or a foam. The liquid can contain monomers such as acrylic acid, 2-hydroxyethyl methacrylate, ethyl acrylate, methyl methacrylate. The liquid can contain other components such as therapeutic agents or antibiotics.

In any of the embodiments, at least one antioxidant can be vitamin E. In any of the embodiments, the photoinitiator can be 4-hydroxybenzophenone.

In any of the embodiments, the polymeric material can be polyethylene, ultrahigh molecular weight polyethylene, low density polyethylene, high density polyethylene, linear low density polyethylene or a combination thereof.

In any of the embodiments, the methods described can be combined with other methods for modifying the polymeric material. In any of the embodiments, the polymeric material exposed to photoirradiation or light can be exposed to another mode of irradiation such as gamma or electron beam irradiation. In any of the embodiments, the polymeric material exposed to photoirradiation can be packaged and sterilized. Sterilization can be performed by gas or irradiation such as by gas plasma, ethylene oxide sterilization or by gamma sterilization.

BRIEF DESCRIPTION OF THE DRAWINGS

FIG. 1 shows the crosslink density of UHMWPE samples blended with different UV initiator concentration (4-HBP) (0.25, 0.5, 0.75, 1.0 wt %) and irradiated with different durations (30, 60, 90 minutes). All samples were irradiated at room temperature.

FIG. 2 shows the crosslink density of 0.5 wt % UV initiator (4-HBP) blended UHMWPE samples photo-crosslinked with UV at different durations (5, 15, 20, 30, 45 and 60 minutes). All samples were irradiated at room temperature.

FIG. 3 shows the crosslink density of 1.0 wt % vitamin E and 0.5 wt % UV initiator (4-HBP) blended UHMWPE samples photo-crosslinked with UV at different irradiation times (15, 30, 45 and 60 minutes). All samples were irradiated at room temperature.

FIG. 4 shows the crosslink density for 0.5 wt % UV initiator (4-HBP) blended UHMWPE samples as a function of vitamin E concentrations (0.1, 0.5, 1.0 and 2.0 wt %). All samples were irradiated for 1 hour at room temperature.

FIG. 5 shows the pin on disk (POD) wear rates for UV initiator (4-HBP) blended with different concentrations (0.1, 0.25, 0.5 and 0.75) UHMWPE samples. All samples were irradiated for 30 minutes at room temperature.

FIG. 6 shows the pin on disk (POD) wear rates for 0.5 wt % UV initiator (4-HBP) blended UHMWPE samples as a function of UV irradiation time (0, 5, 15, 20, 30, 45 and 60 minutes). All samples were irradiated at room temperature.

FIG. 7 shows the pin on disk (POD) wear rates for 0.5 wt % UV initiator (4-HBP) and 1.0 wt % vitamin E blended UHMWPE samples as a function of irradiation time (0, 15, 30, 45 and 60 minutes). All samples were irradiated at room temperature.

FIG. 8 shows the pin on disk (POD) wear rates for 0.5 wt % UV initiator (4-HBP) blended UHMWPE samples as a function of vitamin E concentrations. All samples were irradiated for 30 minutes at room temperature.

FIG. 9 shows the pin on disk (POD) wear rates for 0.5 wt % UV initiator (4-HBP) blended UHMWPE samples as a function of vitamin E concentrations. All samples were irradiated for 60 minutes at room temperature.

DETAILED DESCRIPTION OF THE INVENTION

"Polymeric material" refers to large molecules or macromolecules composed of many repeating subunits. "Polymeric material" includes polyolefins such as polyethylene or polypropylene. Polyethylene can include low density polyethylene(s), and/or linear low density polyethylene(s) and/or high density polyethylene(s) and/or ultrahigh molecular weight polyethylene(s) or mixtures thereof. For example, ultra-high molecular weight polyethylene (UHMWPE) refers to linear non-branched chains of ethylene having molecular weights in excess of about 500,000, preferably above about 1,000,000, and more preferably above about 2,000,000. Often the molecular weights can reach about 8,000,000 or more. By initial average molecular weight is meant the average molecular weight of the UHMWPE starting material, prior to any irradiation. See U.S. Pat. Nos. 5,879,400 and 6,641,617, EP0881919, WO2001/005337, and WO1999/029793. The term "polyethylene article" or "polymeric article" or "polymer" generally refers to articles comprising any "polymeric material" disclosed herein.

"Polymeric material" or "polymer" can be in the form of resin, flakes, powder, consolidated stock, implant, and can contain additive(s), antioxidant(s), and/or therapeutic agent(s). The "polymeric material" or "polymer" also can be a blend of one or more of different resin, flakes or powder containing different concentrations of additive(s), antioxidant(s) and/or therapeutic agent(s) and/or a chemical cross-linking agents and/or anticross-linking agents and/or cross-linking enhancers. The blending of resin, flakes or powder can be achieved by the blending techniques known in the art. The "polymeric material" also can be a consolidated stock of these blends.

"Polymeric materials" or "polymers" can also include structural subunits different from each other. Such polymers can be di- or tri- or multiple unit-copolymers, alternating copolymers, star copolymers, brush polymers, grafted copolymers or interpenetrating polymers. They can be essentially solvent-free during processing and use such as thermoplastics or can include a large amount of solvent such as hydrogels. Polymeric materials also include synthetic polymers, natural polymers, blends and mixtures thereof. Polymeric materials also include degradable and non-degradable polymers.

The products and processes of this invention also apply to various types of polymeric materials, for example, any polypropylene, any polyamide, any polyether ketone, or any polyolefin, including high-density-polyethylene, low-density-polyethylene, linear-low-density-polyethylene, ultra-high molecular weight polyethylene (UHMWPE), copolymers or mixtures thereof. The products and processes of this invention also apply to various types of hydrogels, for example, poly(vinyl alcohol), poly(ethylene glycol), poly(ethylene oxide), poly(acrylic acid), poly(methacrylic acid), poly(acrylamide), copolymers or mixtures thereof, or copolymers or mixtures of these with any polyolefin. Polymeric materials, as used herein, also applies to polyethylene of various forms, for example, resin, powder, flakes, particles, powder, or a mixture thereof, or a consolidated form derived from any of the above. Polymeric materials, as used herein, also applies to hydrogels of various forms, for example, film, extrudate, flakes, particles, powder, or a mixture thereof, or a consolidated form derived from any of the above.

By "medical device", what is meant is an instrument, apparatus, implement, machine, implant or other similar and related article intended for use in the diagnosis, treatment, mitigation, cure, or prevention of disease in humans or other animals. An "implantable device" is a medical device intended to be implanted in contact with the human or other animal for a period of time. "Implant" refers to an "implantable medical device" where a medical device, is placed into contact with human or animal skin or internal tissues for a prolonged period of time, for example at least 2 days or more, or at least 3 months or more or permanently. Implants can be made out of metals, ceramic, polymers or combinations thereof. They can also comprise fluids or living tissues in part or in whole. An "implant" can refer to several components together serving a combined function such as "total joint implant" or it can refer to a single solid form such as an "acetabular cup" as a part. The term 'medical implant' refers to a medical device made for the purpose of implantation in a living body, for example and animal or human body. The medical implants include but are not limited to acetabular liners, tibial inserts, glenoid components, patellar components, and other load-bearing, articular components used in total joint surgery. While medical implants can be load-bearing to some extent some bear more load than others. For instance a tibial insert bears more load than a man-hole cover implant used to cover screw holes in acetabular shells. The term "permanent device" refers to what is known in the art that is intended for implantation in the body for a period longer than several months. Permanent devices include medical implants or devices, for example, acetabular liner, shoulder glenoid, patellar component, finger joint component, ankle joint component, elbow joint component, wrist joint component, toe joint component, bipolar hip replacements, tibial knee insert, tibial knee inserts with reinforcing metallic and polyethylene posts, intervertebral discs, sutures, tendons, heart valves, stents, and vascular grafts. The term "medical implant" refers to what is known in the art as a device intended for implantation in animals or humans for short or long term use. The medical implants, according to an aspect of the invention, comprises medical devices including acetabular liner, shoulder glenoid, patellar component, finger joint component, ankle joint component, elbow joint component, wrist joint component, toe joint component, bipolar hip replacements, tibial knee insert, tibial knee inserts with reinforcing metallic and polyethylene posts, intervertebral discs, sutures, tendons, heart valves, stents, and vascular grafts, fracture plates.

The term "cross-linking" refers to what is known in the art as processes that result in the covalent bonding of the parts of a material, for example polymer chains in a polymeric material. In the case of UHMWPE, which is a semi-crystalline polymer, there is covalent bonding of the polymer chains of the polymeric material. For instance, the cross-link density of polyolefins, such as polyethylene can be measured by swelling a roughly 3×3×3 mm cube of polymeric material in xylene. The samples are weighed before swelling in xylene at 130° C. for 2 hours and they are weighed immediately after swelling in xylene. The amount of xylene uptake is determined gravimetrically, and then converted to volumetric uptake by dividing by the density of xylene; 0.75 g/cc. By assuming the density of polyethylene to be approximately 0.94 g/cc, the volumetric swell ratio of cross-linked UHMWPE is then determined. The cross-link density is calculated by using the swell ratio as described in Oral et al., Biomaterials 31: 7051-7060 (2010) and is reported in mol/m$^3$. The term 'cross-linked' refers to the state of polymeric material that is cross-linked to any level.

The term 'grafting' refers to what is known in the art as one or more chemical moieties or oligomers being covalently bonded to the main chain of a surface or a polymeric material or a polymeric material surface as side chains having constitutional or configurational features different than the main chain or surface or material. The term 'photografting' refers to grafting method used to covalently attachment of polymer chains with different chemical structure onto another substrate by using light initiation mechanism. For example, in some embodiments, poly(acrylic acid) or poly(2-hydroxyethyl methacrylate) can be grafted onto a polymeric material such as UHMWPE in resin form and/or on consolidated surfaces; and in other embodiments, antioxidants and/or additives can be grafted onto a polymeric material including UHMWPE in resin form and/or on consolidated surfaces.

The term "additive" refers to any material that can be added to a base polymeric material in less than 50 wt/wt %. This material can be an organic or inorganic material with a molecular weight less than that of the base polymer. An additive can impart different properties to the polymeric material, for example, it can be a therapeutic agent, a nucleating agent, a cross-linking agent, an anti-cross-linking agent, and/or any combination thereof. Additives can be also combined with one or more antioxidants. Concentrations of the additives or the antioxidants can be from 0.001 wt % to 50 wt %, or any value therebetween, or from 0.01 wt % to 20 wt %, or from 0.1 wt % to 10 wt %, or 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20 wt %, or more.

The term 'initiator' refers to what is known in the art as a compound or additive which undergoes a chemical change to initiate chemical reactions such as crosslinking of the polymeric material. Accordingly, a 'UV initiator' is a compound which undergoes a chemical change when exposed to ultraviolet light and can further reactions in the polymeric material. In many cases, it is a small organic molecule (except in few cases it corresponds to an organometallic compound) which can also be known as a photoinitiator. It is sensitive to light and can undergo photochemical cleavage (TYPE I) or excitation (TYPE II) when exposed to light or photoirradiation (UV or visible) to produce reactive species. Each photoinitiator has specific and different absorption characteristics and can react most efficiently when exposed to a certain UV wavelength or wavelength range. For photoinitiation to proceed efficiently, the absorption bands of the photoinitiator must match with the emission spectrum of the light source. The UV initiator can be benzophenone, 4-hydroxybenzophenone or can be chosen from but is not limited to those shown in Table 1.

The term "peak melting temperature" or "peak melting point" refers to what is known in the art as the melting transition of a polymeric material, where the material goes to a transition from a solid to a melt state. In a semi-crystalline material such as UHMWPE, this transition can overlap with the melting temperature of its crystalline portion. It can be determined using a differential scanning calorimeter at a heating rate of 10° C./min from −20° C. to 200° C. The peak melting temperature for UHMWPE is generally about 135° C. to about 140° C., or can be about 144° C. to about 147° C. if it contains extended chain crystals.

The term "therapeutic agent" refers to what is known in the art, that is, a chemical substance or a mixture thereof capable of eliciting a healing reaction from the human body. A therapeutic agent can be referred to also as a "drug" in this application. The therapeutic agent can elicit a response that is beneficial for the human or animal. Examples of therapeutic agents are antibiotics, anti-inflammatory agents, anesthetic agents, anticoagulants, hormone analogs, contraceptives, vasodilators, vasoconstrictors, or other molecules classified as drugs in the art. A therapeutic agent can sometimes have multiple functions.

Examples of therapeutic agents are antimicrobials such as Gatifloxacin, gemifloxacin, moxifloxacin, levofloxacin, pefloxacin, ofloxacin, ciprofloxacin, aztreonam, meropenem, imipenem, ertapenem, doripenem, piperacillin, Piperacillin-Tazobactam, Ticarcilin-Clavulanic acid, Ticarcillin, ampicillin-sulbactam, amoxicillin-clavulanic acid, ampicillin-amoxicillin, cloxacillin, nafcillin, oxacillin, methicillin, penicillin V, penicillin G, cefpodox, cefdinir, cefditoren, ceftibuten, cefixime, cefuroxime axetil, cefprozil, cefaclor, loracarbef, cephalexin, cefadroxil, cefepime, ceftazidime, ceftaroline, ceftriaxone, ceftizoxime, cefotaxime, cefuroxime, cefuroxime acetil, cefaclor-CD, cefoxitin, cefotetan, cefazolin, cefdinir, cefditoren pivoxil, cefixime, cefpodoxime proxetil, ceftobiprole, colistimethate, linezolid, quinupristin-dalfopristin, metronidazole, rifampin, fosfomycin, nitrofurantoin, TMP-SMX, trimethoprim, fusidic acid, telavancin, teicoplanin, Vancomycin HCl, vancomycin free base, daptomycin, tigecycline, minocycline, doxycycline, telithromycin, clarithromycin, azithromycin, azithromycin ER, erythromycin, clindamycin, chloramphenicol, amikacin, tobramycin, gentamycin, aztreonam, kanamycin, tetracycline, tetracycline HCl, polymyxin B, rifaxim in, tigecycline, amphotericin B, fluconazole, itraconazole, ketoconazole, posaconazole, voriconazole, anidulafungin, caspofungin, flucytosine, micafungin, capreomycin, cycloserine, ethambutol, ethionamide, isoniazid, para-aminosalocylic acid, pyrazinamide, rifabutin, rifapentine, streptomycin, albendazole, artemether/lumefantrine, atovaquone, dpasone, ivermectin, mefloquine, miltefosine, nitazoxanide, proguanil, pytimethamine, praziquantel, tinidazole. Antiviral such as acyclovir, cidofovir, probenecid, entecavir, famciclovir, foscarnet, ganciclovir, oseltamivir, peramivir, ribavirin, rimantadine, telbiudine, valacyclovir, valgancciclovir, abacavir, atazanavir, darunavir, delaviridine, didanosine, efavirenz, emtricitabine, enfuvirtide, etravirine, fosamprenavir, indinavir, lam ivudine, lopinavir, maraviroc, nelfinavir, nevirapine, raltegravir, ritonavir, sasquinavir, stavudine, tenofovir, tipranavir, zidovudine. Antifibrinolytics such as C-aminocaproic acid, tranexamic acid, lysine, aprotinin. Antineoplastics such as mechlrethamine, phenylalanine mustard, chlorambucil, cyclophosphamide, busulfan, triethylene-thiophosphoramide, carmustine, DTIC, methotrexate, 5-fluorouracil, 6-mercaptopurine, vincristine, procarbazone, prednisone, acivicin, aclarubicin, acodazole, acronine, adozelesin, alanosine, alpha-Tgdr, altretamine, am bomycin, amentantrone acetate, aminopterin, aminothiadiazole, amsacrine, anguinide, aniline mustard, anthramycin, azaribine, 5-aza-2'Deoxycytidine, 8-azaguanine.

The term "irradiation" refers to what is known in the art as exposing a material to radiation, for example ionizing radiation such as a gamma, electron, X-ray or ultraviolet (UV) radiation. The term 'photoinitiation' refers to the production of radical or ion species when exposed to light. These species can be capable of initiating chain reaction such as a polymerization, copolymerization, grafting, and crosslinking of the polymeric material. Two different photoinitiation mechanisms, the so-called Norrish Type I' and 'Norrish Type II' are known.

"Radiation cross-linking" refers to a radiation process intended to cross-link a material as a result of irradiation, for example exposing UHMWPE to gamma irradiation to cross-link the material. It also refers to the cross-linking in the material that has resulted from a radiation process. The radiation dose used can be from 0.0001 kGy to 100,000 kGy, or any value therebetween, or 0.1 kGy to 1000 kGy, or from 1 kGy to 1000 kGy, or from 10 kGy to 1000 kGy, or from 25 kGy to 1000 kGy, or from 50 kGy to 1000 kGy, or from 100 kGy to 1000 kGy, or from 1 kGy to 300 kGy, or about 65 kGy, or about 75 kGy, or about 85 kGy, or about 100 kGy, or about 150 kGy, or about 175 kGy, or about 200 kGy. The radiation dose rate can be from 0.001 kGy/min to 100,000 kGy/min, or any value therebetween, or from 0.1 kGy/min to 100 kGy/min, or from 1 kGy/min to 50 kGy/min, or about 25 kGy/min, or about 10 kGy/min, or about 100 kGy/min. Irradiation can be done in air, in vacuum, or partial gas environments, for example mixtures of oxygen and nitrogen. It can also be done in inert gas or partial inert gas. It can also be done at ambient temperature, or below or above ambient temperature. It can be done at elevated temperatures above ambient temperature. Irradiation temperature can be from −100° C. to 1000° C., or any value therebetween, or from 0° C. to 500° C. or from 20° C. to 200° C. or from 25° C. to 150° C., or at about 25° C., or about 70° C., or about 100° C., or about 120° C., or about 125° C. Methods of "exposing to radiation" or "irradiation" are described, for example in U.S. Pat. No. 7,381,752 (Muratoglu), U.S. Pat. No. 7,858,671 (Muratoglu et al.) and U.S. Pat. No. 6,641,617 (Merrill et al.). Also, methods of irradiation and treatments after irradiation are described, for example in U.S. Pat. No. 7,431,874 (Muratoglu et al.), U.S. Pat. No. 6,852,772 (Muratoglu et al.), U.S. Pat. No. 8,420,000 (Muratoglu et al.), U.S. Pat. No. 8,461,225 (Muratoglu et al.) and U.S. Pat. No. 8,530,057 (Muratoglu et al.). The term 'photo-crosslinking' refers to UV-initiated formation of covalent bonds between two macromolecules or between two different parts of a polymeric material. Different kind of photoinitiators (Type I or II) which have photoreactive groups can be used to absorb UV light and initiate crosslinking.

The term "blending" refers to what is known in the art; that is, mixing of different components, often liquid and solid or solid and solid to obtain a homogeneous mixture of said components. Blending generally refers to mixing of a polymeric material in its pre-consolidated form with an additive and/or an antioxidant. If both constituents are solid, blending can be done by using other component(s) such as a liquid to mediate the mixing of the two components, after which the liquid is removed by evaporating. If the additive and/or the antioxidant is liquid, for example α-tocopherol, then the polymeric material can be mixed with large quantities of the said liquid. This high concentration blend can be diluted down to desired concentrations with the addition of lower concentration blends or virgin polymeric material without the additive and/or the antioxidant to obtain the desired concentration blend. This technique also results in improved uniformity of the distribution of the additive and/or the antioxidant in the polymeric material. Methods of blending additives and/or antioxidants into polymeric material are described, for example in U.S. Pat. Nos. 7,431,874, 9,168,683, 8,425,815, 9,273,189, and WO2007/024684A2 (Muratoglu et al.).

The term "diffusion" refers to what is known in the art; that is, the net movement of molecules from an area of high concentration to an area of low concentration. In these embodiments, it is defined to be interchangeably used with 'doping by diffusion'. The term "doping" refers to a general process well known in the art (see, for example, U.S. Pat. Nos. 6,448,315 and 5,827,904), that is introducing antioxidant(s) to a material. Doping may also be done by diffusing an additive and/or antioxidant into the polymeric material by immersing the polymeric material by contacting the polymeric material with the additive and/or the antioxidant in the solid state, or with a bath of the additive and/or the antioxidant in the liquid state, or with a mixture of the additive and/or the antioxidant in one or more solvents in solution, emulsion, suspension, slurry, aerosol form, or in a gas or in a supercritical fluid. The doping process by diffusion can involve contacting a polymeric material, medical implant or device with an additive, such as 4-hydroxybenzophenone, for about thirty minutes to several days, preferably for about a minute to 6 hours. The doping time can be from a second to several weeks, or it can be 1 minute to 24 hours, or it can be 15 minutes to 24 hours in 15 minute intervals. The environment for the diffusion of the additive (bath, solution, emulsion, paste, slurry and the like) can be heated to below room temperature or up to about 200° C. and the doping can be carried out from −20° C. to room temperature or up to about 200° C. For example, when doping a polymeric material by an antioxidant, the medium carrying the antioxidant can be heated to 100° C. and the doping is carried out at 100° C. Similarly, when doping a polymeric material with therapeutic agent(s), the medium carrying the therapeutic agent(s) can be cooled or heated. Or the doping can be carried out at −20° C., −10° C., 0, 5, 10, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 230, 240, 250, 260, 270, 280, 290, 300, 320 and 340° C., and any value therebetween. If the additive is a peroxide, the doping temperature may be below the peroxide initiation temperature, at the peroxide initiation temperature or above the peroxide initiation temperature or parts of the doping process may be done at different temperatures. A polymeric material incorporated with an additive by diffusion in such a way is termed an "additive-diffused" polymeric material. If the additive is an initiator, a polymeric material incorporated with the additive is termed a "initiator-diffused" polymeric material. Diffusion of antioxidants by high temperature doping and homogenization methods are described in Muratoglu et al. (U.S. Pat. Nos. 7,431,874 and 9,370,878), which are incorporated by reference in its entirety.

The term "coating" refers to the physical covering of a material such as a polymeric material by an additive and/or an antioxidant. For example, a compound such as vitamin E can be dissolved in solvent(s) before immersing a polymeric material into the solution and the solvent can be subsequently evaporated. Using such a method, the polymeric material would be coated by the antioxidant, such as vitamin E. 'Coating' can sometimes be interchangeably used with 'doping'. Coating generally refers to the presence of the additive and/or the antioxidant for coating to remain exclusively on the surfaces of the second material to be coated. Since the depth of penetration into the material to be coated is generally dependent on the time of exposure, 'doping' can result in 'coating'. A polymeric material which has been immersed in a solution of the additive and/or the antioxidant, or material to be used for coating can be referred to as an 'additive-coated' and/or 'antioxidant-coated' polymeric material. For example, UHMWPE resin flakes immersed into a solution or emulsion of 4-hydroxybenzophenone can be referred to as '4-hydroxybenzophenone-coated' polymeric material. This definition can be used before or after the evaporation of any solvents, whose presence is not desirable in the long term.

The term "antioxidant" refers to what is known in the art as (see, for example, U.S. Pat. No. 8,933,145, WO2001/80778, and U.S. Pat. No. 6,448,315). Alpha- and delta-tocopherol; propyl, octyl, or dodecyl gallates; lactic, citric, ascorbic, tartaric acids, and organic acids, and their salts; orthophosphates, lycopene, tocopherol acetate are generally known form of antioxidants. Antioxidants are also referred as free radical scavengers, include: glutathione, lipoic acid, vitamins such as ascorbic acid (vitamin C), vitamin B, vitamin D, vitamin-E, tocopherols (synthetic or natural, alpha-, gamma-, delta-), acetate vitamin esters, water soluble tocopherol derivatives, tocotrienols, water soluble tocotrienol derivatives; melatonin, carotenoids, including various carotenes, lutein, pycnogenol, glycosides, trehalose, polyphenols and flavonoids, quercetin, lycopene, lutein, selenium, nitric oxide, curcuminoids, 2-hydroxytetronic acid; cannabinoids, synthetic antioxidants such as tertiary butyl hydroquinone, 6-amino-3-pyrodinoles, butylated hydroxyanisole, butylated hydroxytoluene, ethoxyquin, tannins, propyl gallate, other gallates, Aquanox family Irganox® and Irganox B families including Irganox® 1010, Irganox®

1076, Irganox® 1330, and purified Irganox®; Irgafos® family including Irgafos® 168; phenolic compounds with different chain lengths, and different number of OH groups; enzymes with antioxidant properties such as superoxide dismutase, herbal or plant extracts with antioxidant properties such as St. John's Wort, green tea extract, grape seed extract, rosemary, oregano extract, mixtures, derivatives, analogues or conjugated forms of these. Antioxidants/free radical scavengers can be primary antioxidants with reactive OH or NH groups such as hindered phenols or secondary aromatic amines, they can be secondary antioxidants such as organophosphorus compounds or thiosynergists, they can be multifunctional antioxidants, hydroxylamines, or carbon centered radical scavengers such as lactones or acrylated bis-phenols. The antioxidants can be selected individually or used in any combination.

Antioxidants can be added to a base polymeric material in less than 50 wt/wt %. This material can be an organic or inorganic material with a molecular weight less than that of the base polymer. An antioxidant can impart different properties to the polymeric material. Antioxidants can be combined with additives, for example, it can be combined with a therapeutic agent, a nucleating agent, a cross-linking agent, an anti-cross-linking agent, or any combination thereof. Antioxidants can be also combined with one or more additives. Concentrations of the antioxidants can be from 0.001 wt % to 50 wt %, or any value therebetween, or from 0.01 wt % to 20 wt %, or from 0.1 wt % to 10 wt %, or 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20 wt %, or more.

The term "consolidation" refers generally to processes used to convert the polymeric material resin, particles, flakes, i.e. small pieces of polymeric material into a mechanically integral large-scale solid form, which can be further processed, by for example machining in obtaining articles of use such as medical implants. Methods such as injection molding, extrusion, compression molding, isostatic pressing (hot or cold), or other methods known in the art can be used. In the present invention, consolidation of layers of polymeric material having different additives and/or antioxidants are described.

Consolidation can be performed by "compression molding". In some instances consolidation can be interchangeably used with compression molding. The molding process generally involves:
  i. heating the polymeric material to be molded,
  ii. pressurizing the polymeric material while heated,
  iii. keeping at temperature and pressure, and
  iv. cooling down and releasing pressure.

Heating of the polymeric material can be done at any rate. Temperature can be increased linearly with time or in a step-wise fashion or at any other rate. Alternatively, the polymeric material can be placed in a pre-heated environment. In some embodiments, the polymeric material is placed into a mold for consolidation and he process (steps i-iv) is started without pre-heating. The mold for the consolidation can be heated together or separately from the polymeric material to be molded. Steps (i) and (ii), i.e. heating and pressurizing before consolidation can be done in multiple steps and in any order. For example, polymeric material can be pressurized at room temperature to a set pressure level 1, after which it can be heated and pressurized to another pressure level 2, which still may be different from the pressure or pressure(s) in step (iii). Step (iii), where a high temperature and pressure are maintained is the 'dwell period' where a major part of the consolidation takes place. One temperature and pressure or several temperatures and pressures can be used during this time without releasing pressure at any point. For example, dwell temperatures in the range of 135 to 350° C. and dwell pressures in the range of 0.1 MPa to 100 MPa or up to 1000 MPa, or any value therebetween, can be used. The dwell time can be from 1 minute to 24 hours, more preferably from 2 minutes to 1 hour, most preferably about 10 minutes. The temperature(s) at step (iii) are termed 'dwell' or 'molding' temperature(s). The pressure(s) used in step (iii) are termed 'dwell' or 'molding' pressure(s). The order of cooling and pressure release (step iv) can be used interchangeably. In some embodiments the cooling and pressure release may follow varying rates independent of each other. In some embodiments, consolidation of polymeric resin or blends of the resin with additive(s) and/or the antioxidant(s) are achieved by compression molding. The dwell temperature and dwell time for consolidation can be changed to control the amount of integration.

Compression molding can also follow "layering" of different polymeric material; in these instances it is termed "layered molding". This refers to consolidating a polymeric material by compression molding one or more of its pre-molded and resin forms, which may be in the form of flakes, powder, pellets or the like or consolidated or pre-molded forms in layers. This may be done such that there can be distinct regions in the consolidated form containing different concentrations of additive(s), antioxidant(s), therapeutic agent(s) and/or crosslinking agent(s). Layering can be done any method that deposits desired polymeric material in desired locations. These methods may include pouring, scooping, painting, brushing spraying. This deposition can be aided by materials, templates and such supporting equipment that do not become an eventual part of the consolidated polymeric material. Whenever a layered-molded polymeric material is described and is used in any of the embodiments, it can be fabricated by:
  (a) layered molding of polymeric resin powder or blends of polymeric material containing a specific additive(s) and/or antioxidant(s) where one or more layers contain the additive(s) and/or antioxidant(s) and one or more layers do not contain the additive(s) and/or antioxidant(s);
  (b) molding together of layers of polymeric material containing different or identical concentration of antioxidant(s) and/or additive(s) such as therapeutic agent(s) and/or crosslinking agent(s).

Layering and spatial control of antioxidant concentrations and polymeric material morphology are described in WO2008/092047A1, U.S. Pat. No. 9,433,705, and U.S. Pat. No. 8,569,395 (Muratoglu et al.), which are incorporated by reference in their entireties.

"Spatially controlled distribution" or "spatial distribution" refers to distribution of a material, such an antioxidant, photoinitiator, photoirradiation or irradiation in a controlled manner, such as a desired amount of the material or photoirradiation exposure is reached to a desired region/layer in a polymeric material, in order to obtain a gradient or a spatial distribution of the material or cross-linking. For Example, a spatial distribution of the antioxidant allows formation of regions/layers within a polymeric material having some regions/layers rich and other regions/layers poor in antioxidant content, which also can be a medical implant or preform containing the spatially controlled antioxidant distribution. Such controlled spatial distribution of the antioxidant allows formation of distinct regions/layer within a polymeric material having some regions/layers with higher and other regions/layers with lower antioxidant content. The intensity of a photoirradiation is dependent on the distance of the exposed parts of a polymeric material from the light source. The distance from the light source can be fixed or adjustable and can be modified as desired to obtain a desired cross-link density on the exposed parts of the polymeric material at a desired region/layer. It can also be modified to obtain the desired crosslinking profile as a function of depth in the polymeric material. Such spatial distribution of cross-linking in certain regions/layers/parts of the polymeric material also can be obtained by shielding the polymeric material during irradiation to attain/prevent crosslinking at a target region/layer/part. Methods of partial and complete shielding approaches to alter the cross-linking characteristics of irradiated polymers and to obtain spatial crosslinking of polymeric material are disclosed by Muratoglu, for example; U.S. Pat. Nos. 7,205,339, 7,381,752, 7,790,779, and WO2002048259A2, the entireties of which are hereby incorporated by reference.

One or more of the layers can be treated before or during molding by heating, or high temperature melting. Methods of high temperature melting are described in WO2010/096771A2, U.S. Pat. No. 8,933,145 (Oral et al.), which are incorporated by reference in their entireties.

The layer or layers to be molded can be heated in liquid(s), in water, in air, in inert gas, in supercritical fluid(s) or in any environment containing a mixture of gases, liquids or supercritical fluids before pressurization. The layer or layers can be pressurized individually at room temperature or at an elevated temperature below the melting point or above the melting point before being molded together. The temperature at which the layer or layers are pre-heated can be the same or different from the molding or dwell temperature(s). The temperature can be gradually increased from pre-heat to mold temperature with or without pressure. The pressure to which the layers are exposed before molding can be gradually increased or increased and maintained at the same level.

During consolidation, different regions of the mold can be heated to different temperatures. The temperature and pressure can be maintained during molding for 1 second up to 1000 hours or longer. During cool-down under pressure, the pressure can be maintained at the molding pressure or increased or decreased. The cooling rate can be, for example, 0.0001° C./minute to 120° C./minute or higher, or any value therebetween. Cooling can be done at any rate. The cooling rate can be different for different regions of the mold. After cooling down to about room temperature, the mold can be kept under pressure for 1 second to 1000 hours, or any value therebetween. Or the pressure can be released partially or completely at an elevated temperature.

In some embodiments, the consolidated polymeric material is fabricated through "direct compression molding" (DCM), which is compression molding using parallel plates or any plate/mold geometry which can directly result in an implant or implant preform. Preforms are generally oversized versions of implants, where some machining of the preform can give the final implant shape. In some embodiments certain features of the final implant shape may be machined after direct compression molding.

In some embodiments, the pre-molded polymeric material is subjected to high temperature melting and subsequently direct compression molded. The direct compression molded polymeric material may be in its final implant shape. In some embodiments certain features of the final implant shape may be machined after direct compression molding. In certain embodiments, the pre-molded polymeric material contains cross-linking agents. In some embodiments the pre-molded polymeric material is subjected to irradiation before the subsequent direct compression molding.

Compression molding can also be done such that the polymeric material is directly compression molded onto a second surface, for example a metal or a porous metal to result in an implant or implant preform. This type of molding results in a "hybrid interlocked polymeric material" or "hybrid interlocked medical implant preform" or "hybrid interlocked medical implant". Molding can be conducted with a second piece, for example a metal that becomes an integral part of the consolidated polymeric article. For example, a combination of antioxidant-containing polyethylene resin, powder, or flake and virgin polyethylene resin, powder or flake is direct compression molded into a metallic acetabular cup or a tibial base plate. The porous tibial metal base plate is placed in the mold, antioxidant blended polymeric resin, powder, or flake is added on top. Prior to consolidation, the pores of the metal piece can be filled with a waxy or plaster substance through half the thickness to achieve polyethylene interlocking through the other unfilled half of the metallic piece. The pore filler is maintained through the irradiation and subsequent processing (for example peroxide diffusion) to prevent infusion of components in to the pores of the metal. In some embodiments, the article is machined after processing to shape an implant. In some embodiments, there is more than one metal piece integral to the polymeric article. The metal(s) may be porous only in part or non-porous. In another embodiment, one or some or all of the metal pieces integral to the polymeric article is a porous metal piece that allows bone in-growth when implanted into the human body. In an embodiment, the porous metal of the implant is sealed using a sealant to prevent or reduce the infusion of antioxidant/peroxide (in diffusion steps after consolidation) into the pores during the selective doping of the implant. Preferably, the sealant is water soluble. But other sealants are also used. The final cleaning step that the implant is subjected to also removes the sealant. Alternatively, an additional sealant removal step is used. Such sealants as water, saline, aqueous solutions of water soluble polymers such as poly-vinyl alcohol, water soluble waxes, plaster of Paris, or others are used. In addition, a photoresist like SU-8, or other, may be cured within the pores of the porous metal component. Following processing, the sealant may be removed via an acid etch or a plasma etch. In these embodiments, the polymeric material, which is molded directly onto a second surface to form the hybrid interlocked polymeric material, maybe a pre-molded polymeric material with or without antioxidant(s), additive(s) and/or cross-linking agent(s). In such embodiments the pre-molded polymeric material may be subjected to high temperature melting and/or radiation cross-linking.

The term "heating" refers to bringing a material to a temperature, generally a temperature above that of its current state. It can also refer to maintaining said temperature for a period of time, that is, in some instances it can be used interchangeably with 'annealing'. Heating can be done at any rate. The heating rate can be, for example, from 0.001° C./min to 1000° C./min, or any value therebetween, or it can be between 0.1° C./min to 100° C./min, or it can be from 0.5° C./min to 10° C./min, or it can be any rate from 1° C./min to 50° C./min in 1° C. intervals. The heating can be done for any duration. Heating time can be from 0.1 minutes to 100 years or from 1 minute to 24 hours or from 1 minute to 12 hours, or 30 minutes to 10 hours, or 5 hours, or 6 hours, or 8 hours, or any value therebetween. The heating can be done in consecutive steps of heating to different temperatures, where one heating temperature is above or below the subsequent heating temperature.

The term "cooling" refers to bringing a material to a temperature, generally a temperature below that of its current state. It can also refer to maintaining said temperature for a period of time, that is, in some instances it can be used interchangeably with 'annealing'. Cooling can be done at any rate. The cooling rate can be from 0.001° C./min to 1000° C./min, or it can be between 0.1° C./min to 100° C./min, or it can be from 0.5° C./min to 10° C./min, or it can be any rate from 1° C./min to 50° C./min in 1° C. intervals, or 2.5° C./min, or any value therebetween. The cooling can be done for any duration. Cooling time can be from 0.1 minutes to 100 years or from 1 minute to 24 hours or from 1 minute to 12 hours, or 30 minutes to 10 hours, or 1 hour, or 2 hours, or 5 hours, or 6 hours, or 8 hours, or any value therebetween.

The terms "about" or "approximately" in the context of numerical values and ranges refers to values or ranges that approximate or are close to the recited values or ranges such that the invention can perform as intended, such as utilizing a method parameter (e.g., time, dose, dose rate/level, and temperature), having a desired amount of initiators or antioxidants, desired degree of cross-linking and/or a desired lack of or quenching of free radicals, as is apparent to the skilled person from the teachings contained herein. This is due, at least in part, to the varying properties of polymer compositions. Thus, these terms encompass values beyond those resulting from systematic and random error. These terms make explicit what is implicit, as known to the person skilled in the art.

The term "sterile" refers to a condition of an object, for example, an interface or a hybrid material or a medical implant containing interface(s), wherein the interface is sufficiently sterile to be medically acceptable, i.e., will not cause an infection or require revision surgery. The object, for example a medical implant, can be sterilized using ionizing radiation or gas sterilization techniques. Gamma sterilization is well known in the art. Electron beam sterilization is also used. Ethylene oxide gas sterilization and gas plasma sterilization are also used. Autoclaving is another method of sterilizing medical implants. Exposure to solvents or supercritical fluids for sufficient to kill infection-causing microorganisms and/or their spores can be a method of sterilizing.

The term 'wear' refers to the removal of material from the polymeric material during articulation or rubbing against another material. For UHMWPE, wear is generally assessed gravimetrically after an initial creep deformation allowance in number of cycles of motion. The term 'wear resistant' refers to the state of a polymeric material where it has low wear. For example, the wear rate is tested on cylindrical pins (diameter 9 mm, length 13 mm) on a bidirectional pin-on-disc wear tester in undiluted bovine calf serum at 2 Hz in a rectangular pattern (5 mm×10 mm) under variable load with a maximum of 440 lbs. as described in Bragdon et al. (*J Arthroplasty* 16: 658-665 (2001)). Initially, the pins are subjected to 0.5 million cycles (MC), after which they are tested to 1.25 million cycles with gravimetric measurements approximately every 0.125 MC. The wear rate is determined by the linear regression of the weight loss as a function of number of cycles from 0.5 to 1.25 MC.

The term "surface" refers to any part of the outside of a solid-form material, which can be exposed to the surrounding liquid, gaseous, vacuum or supercritical medium. The surface can have a depth into the bulk of the material (normal to the surface planes), from several microns ($\mu$m) to several millimeters. For example, when a 'surface layer' is defined, the layer can have a thickness of several nanometers to several microns ($\mu$m) to several millimeters. For example, the surface layer can be 100 microns (100 $\mu$m) or 500 microns (500 $\mu$m) or 1000 microns (1 mm) or 2 mm or it can be between 2 and 5 mm, or any value therebetween. The surface or surfaces can also be defined along the surface planes. For example, a 5 mm wide and 15 mm long oval section of the articulating surface of a tibial knee insert can be defined as a 'surface' to be layered with a UHMWPE containing antioxidants and/or additives. These surfaces can be defined in any shape or size and the definition can be changed at different processing step.

The term "packaging" refers to the container or containers in which a medical device is packaged and/or shipped. Packaging can include several levels of materials, including bags, blister packs, heat-shrink packaging, boxes, ampoules, bottles, tubes, trays, or the like or a combination thereof. A single component may be shipped in several individual types of package, for example, the component can be placed in a bag, which in turn is placed in a tray, which in turn is placed in a box. The whole assembly can be sterilized and shipped. The packaging materials include, but are not limited to, vegetable parchments, multi-layer polyethylene, Nylon 6, polyethylene terephthalate (PET), and polyvinyl chloride-vinyl acetate copolymer films, polypropylene, polystyrene, and ethylene-vinyl acetate (EVA) copolymers.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts.

Accordingly, the descriptions provided herein are meant to be exemplary, and does not limit the scope of present inventive concepts.

A number of examples are provided herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts.

EXAMPLES

Example 1. Blending UHMWPE Powder with UV Initiator Powder

4-Hydroxybenzophenone (4-HBP) (98%, Sigma Aldrich, USA) was mixed with GUR1020 UHMWPE powder at different weight percentages (Table 2). The powder mixture was then mixed in turbulator at 49 rpm for 1.5 hour at room temperature.

Example 2. Blending UHMWPE with Vitamin-E with UV Initiator Powder

Vitamin E blends of UHMWPE were prepared from medical grade GUR1020 UHMWPE powder (Ticona, Bishop Tex.). Vitamin-E blended UHMWPE samples with different vitamin-E percentages was prepared from master batch powder mixture (UHMWPE (2.0 wt % Vit. E)). Then, 4-Hydroxybenzophenone (4-HBP) (98%, Sigma Aldrich, USA) was mixed with vitamin-E blended GUR1020 UHMWPE at a concentration of 0.5 wt % (Table 3). The powder mixture was then mixed in turbulator at 49 rpm for 1.5 hour at room temperature.

Example 3. Coating UHMWPE Powder with UV Initiator

4-Hydroxybenzophenone (4-HBP) is dissolved in ethanol and then mix with GUR1020 UHMWPE powder at different weight percentages at room temperature. The mixing of UV initiator and UHMWPE powder in ethanol solution is done in an opened container to evaporate ethanol from mixture.

Example 4. Preparation of Consolidated and Annealed Samples from UHMWPE and UV Initiator Powder Blends The powder mixtures prepared as described in Example 1 or Example 2 were then transferred to the female part of a stainless steel mold (85×50×55 mm, tibial mold). The female part containing powder and the male part of a stainless mold were pre-heated at 180° C. for 45 minutes in air in a convection oven. After 45 minutes of pre-heating, the mold was assembled by placing male part of the mold onto the female part of the mold. Then, the mold was transferred between preheated platens (at 180° C.) and the sample was compression molded under 20 MPa pressure at 180° C. for 15 minutes and then cooled under 20 MPa pressure to approximately 15° C. in 45 minutes. The resulting molded sample was taken out of the mold and annealed at 130° C. for 5 hour, at 105° C. for 4 hour and 30° C. for 4 hour.

Example 5. Preparation of Consolidated and Annealed Samples from UV Initiator Coated UHMWPE Powder Samples The powder mixtures prepare as described in Example 3 is then consolidated and annealed as described in Example 3.

Example 6. UV Irradiation of Molded, Annealed and Machined Samples

Compression molded, annealed and then machined samples prepared as described in Example 4 were exposed to UV irradiation from a medium pressure, quartz, mercury-vapor UV lamp (ACE glass photochemical immersion lamp) (450 W, 50 mm O.D. quartz well, 120 V) for different durations (5, 15, 30, 45, 60 min) (Table 4). UV lamp was inserted into its quartz immersion well and water flow at 20'C to prevent over-heating of UV lamp during irradiation. The distance between UV lamp and surface of sample was 7 cm. The intensity of the lamp was ~370 mW/cm$^2$.

Example 7. UV Irradiation of Molded and Machined Samples

Compression molded and machined samples prepared as described in Example 4 without applied annealing process and then samples were exposed to UV irradiation as described in Example 6.

Example 8. UV Irradiation of Powder Samples

The powder mixtures prepared as described in Example 1 or Example 2 and then irradiated as described in Example 6. Consolidated and annealed samples from UV irradiated powder samples prepared as described in Example 4.

Example 9. Grafting Hydrophilic Polymers by UV Induced Photogafting onto UHMWPE Powder Samples Benzophenone (BP) (98%, Sigma Aldrich, USA) was dissolved in an acetone and then GUR1020 UHMWPE powder added to the medium. Benzophenone was coated on UHMWPE powder by evaporation of acetone from mixture in the dark at room temperature. 2-Hydroxyethyl methacrylate monomer (HEMA) (98%, Aldrich, USA) was dissolved in an acetone/water (v/v, 50/50) solvent mixture and was then mixed with benzophenone coated UHMWPE powder mixture. Then, argon was purged through the suspension in order to reduce dissolved O2. The degassed suspension was irradiated by UV irradiation at room temperature for different durations. The photo-induced graft polymerization was carried out with a medium pressure, quartz, mercury-vapor UV lamp (ACE glass photochemical immersion lamp) (450 W, 50 mm O.D. quartz well, 120 V) in a UV reactor (1000 ml, 14/20 angled joint for sparger tube, one-24/40 vertical joint for condenser and one #7-Ace-Thred side arm for thermometer. Center joint is #50 Ace-Thred.). After the polymerization, HEMA grafted UHMWPE powder samples were removed from the suspension and washed with water and ethanol and then dried in a vacuum oven. HEMA grafted UHMWPE powder was mixed with virgin GUR1020 UHMWPE powder at different percentages (5, 10, 25, 50 wt. %). Then powder mixture was transferred to the female part of a stainless steel mold (85×50×55 mm) and the mold was assembled by placing the male part of the mold into the female part of the mold. Then, the mold was transferred between preheated platens (at 180° C.) and the sample was compression molded under 10 MPa pressure at 180° C. for 90 minutes and then cooled under 10 MPa pressure to approximately 15° C. in 90 minutes. The resulting molded sample was taken out of the mold and then machined.

Example 10. Grafting Hydrophilic Polymers by UV Induced Photografting onto UHMWPE Consolidated Samples The GUR1020 UHMWPE powder was placed in the female part of a stainless steel mold (85×50×55 mm) and the mold was assembled by placing the male part of the mold into the female part of the mold. Then, the mold was transferred between preheated platens (at 180° C.) and the sample was compression molded under 10 MPa pressure at 180° C. for 90 minutes and then cooled under 10 MPa pressure to approximately 15° C. in 90 minutes. The resulting molded sample was taken out of the mold and then machined. Machined samples were immersed in an acetone solution containing benzophenone (BP) (98%, Sigma Aldrich, USA). Benzophenone was coated on consolidated sample by evaporation of acetone from mixture solution in the dark at room temperature. Then samples were irradiated using UV irradiation as described in Example 9.

Example 11. Cross-Linking Density Measurement

The crosslink density of the irradiated samples were measured using thin films (200 μm films, n=3) prepared by cutting with microtome. First all samples cut with microtome and then cross-linked with UV irradiation. Then irradiated samples were placed in 25 ml of pre-heated xylene at 130° C. in an oil bath and were allowed to swell for 2 hours. The dry sample weight and the swollen weight were weigh in sealed vials before and after xylene immersion to determine a gravimetric swell ratio. The gravimetric swelling ratio was converted to volumetric swell ratio using density of the dry polymer as 0.94 g/cm$^3$ and the density of the xylene at 130° C. as 0.75 g/cm$^3$. The cross-link density of the samples was calculated using the following equations:

$$d_x(\text{mol/cm}^3) = -\frac{\ln(1-q_{eq}^{-1}) + q_{eq}^{-1} + Xq_{eq}^{-2}}{V_1 q_{eq}^{-1/3}} \quad \begin{array}{l} V_1 = 136 \text{ cm}^3/\text{mol} \\ X = 0.33 + \dfrac{0.55}{q_{eq}} \end{array}$$

where the $V_1$ is the molar volume of the solvent at 130° C. and X is the polymer solvent interaction parameter at 130° C.

The cross-link density results of the irradiated samples are reported in FIG. 1, 2, 3, 4.

FIG. 1, 2, 3, 4 show the cross-link density results (mol/m$^3$) of virgin and vitamin-E blended UHMWPE blended with 4-HBP, which were cross-linked by UV irradiation as a function of UV initiator concentration, UV irradiation duration (time) and vitamin-E concentration.

As seen at FIG. 1, crosslinking density of the virgin samples, which are irradiated at different irradiation times, increased with increasing UV initiator concentration when the concentration increase from 0.25 wt. % to 0.75 wt. % and it decreased when the UV initiator concentration increased from 0.75 wt. % to 1.0 wt. %.

As seen at FIGS. 2 and 3, crosslinking density of the samples increased with increasing UV irradiation time for UHMWPE-4HBP samples with or without vitamin-E.

As seen at FIG. 4, crosslinking density of the samples decreased with increasing vitamin-E concentration in the blend.

Example 12. Wear Testing

The wear rate of UHMWPE samples cross-linked by blending with the UV initiator 4-HBP, molding and UV irradiation as described in Examples 1, 2, 4 and 6 was measured by bidirectional pin-on-disc testing by articulating cylindrical pins machined from the samples with the UV exposed surface as wear surfaces (9 mm diameter and 9.5 mm height) against cobalt-chromium-molybdenum alloy disks at 2 Hz for 1.1 million cycles (MC) in undiluted bovine serum preserved with Penicillin-Streptomycin (Sigma, USA) and EDTA (Fisher Chemical, USA). Wear was measured gravimetrically at 0.5 MC at every 0.16 MC afterwards. The wear rate was calculated by the linear regression of the wear against number of cycles from 0.5 to 1.1 MC.

The wear rate test results are shown in FIGS. 5, 6, 7, 8 and 9. The results showed that low (1-2 mg/MC) and extremely low (<1 mg/MC) wear rates could be obtained using UV initiated crosslinking for virgin UHMWPE and Vitamin-E blended UHMWPE by controlling UV initiator concentration, UV irradiation time and vitamin-E concentration.

The extremely low wear rates could be obtained when the UV initiator concentration increased from 0.1 wt. % to 0.25 wt. % and 0.5 wt. % for virgin samples (FIG. 5).

UV initiated crosslinking method is really fast, easy and cost effective method when compared to high energy radiation crosslinking (gamma and e-beam) method. For virgin samples 15 minutes (FIG. 6) and for 1 wt. % vitamin E blended samples 45 minutes (FIG. 7) UV irradiation time was enough to get low wear rate and high wear resistance.

The wear rate did not change significantly for 0.1 wt. %, 0.2 wt. %, 0.5 wt. % vitamin-E blended samples for 30 minutes irradiated samples (FIG. 8) and for 0.5 wt. %, 1.0 wt. % vitamin-E blended samples for 60 minutes irradiated samples (FIG. 9) and increased with increasing vitamin E concentration to 2.0 wt. %.

Example 13. Tensile Testing

Tensile testing was performed with dogbones in accordance with ASTM D638. Thin sections (3.2 mm thick) were machined from consolidated and annealed samples before crosslinking and dogbones were stamped from thin sections after crosslinking. The dogbones were tested in tension at a crosshead speed of 10 mm/min. The strain was measured by a laser extensometer.

UV initiated cross-linking decreased mechanical properties of UHMWPE blends. The UTS of the UV cross-linked UHMWPEs (with 0.25 wt. %, 0.5 wt. % and 0.75 wt. % 4-HBP) reduced with increasing UV irradiation time and after 30 minutes irradiation did not change significantly. Furthermore, the ultimate tensile strength (UTS) of the samples decreased with increasing UV initiator concentration. Reduction in UTS values related to increasing of cross-link density of the samples with increasing UV irradiation time and UV initiator concentration.

Example 14. TVI Analysis with FT-IR

Trans-vinylene index (NI) of non-irradiated and UV irradiated samples was analyzed by using a Fourier transform infrared spectroscopy (FT-IR). The TVI levels are an indicator of the radiation absorption efficiency of UHMWPE. The TVI was calculated for each spectrum by normalizing the area under the trans-vinylene wavelength at 965 cm$^{-1}$ to that under the 1895 cm$^{-1}$ wavelength. Trans-vinylene concentration of the irradiated samples were determined using microtomed thin sections (approximately 200 urn). For surface analysis of UV irradiated samples, the thin sections microtomed horizontally from the side of the UV exposed surface. The IR spectras were collected at 50 um intervals.

The TVI values on the surface of 0.5 wt. % UV initiator blended samples increased with increasing UV irradiation time. Uniform TVI profile was observed on the irradiated surface which showed homogenous cross-linking on the surface.

Example 15. Measurement of Oxidation Induction Time (OIT)

To determine oxidation induction time (OIT), small samples (5-10 mg, n=3) of the non-irradiated and UV irradiated samples were put into standard aluminum pans without lids and then placed in the furnace of the differential scanning calorimetry (DSC). The samples were heated from 20 to 200° C. at a rate of 20° C./min. under a nitrogen flow of 50 mL/min. After maintaining nitrogen flow for 5 minutes at 200° C., the gas was switched to oxygen at a flow rate of 50 mL/min. This was recorded as time zero. The onset of oxidation was determined as the intercept of the extended baseline and the steepest tangent drawn to the oxidation exotherm. All OITs were calculated as the average of n=3 specimens.

When the UV initiator concentration was maintained constant, the oxidation induction time increased with increasing vitamin-E concentration in the blend. Furthermore, the OIT values of vitamin-E blended samples decreased after 30 minutes irradiation probably because of free radical scavenging by vitamin E during the UV irradiation. The OIT of UV cross-linked UHMWPE without vitamin-E is really low compared to vitamin-E blended samples. Using higher vitamin-E concentrations provide long-term oxidation resistance for UV irradiated UHMWPE samples.

Example 16. Grafting Hydrophilic Polymers by UV Induced Photografting onto UHMWPE Powder Blended with Photoinitiator 4-Hydroxybenzophenone (4-HBP) is mixed with UHMWPE powder at different weight percentages from 0.01 to 1.0 wt %. 2-Hydroxyethyl methacrylate monomer (HEMA) is dissolved in an acetone/water (v/v, 50/50) solvent mixture and is then mixed with 4-NBP blended UHMWPE. Then, argon is purged through the suspension in order to reduce dissolved $O_2$. The degassed suspension is irradiated by UV irradiation at room temperature for different durations. The photo-induced graft polymerization is carried out with a medium pressure, quartz, mercury-vapor UV lamp (450 W, 50 mm O.D. quartz well, 120 V) in a UV reactor (1000 ml, 14/20 angled joint for sparger tube, one-24/40 vertical joint for condenser and one #7-Ace-Thred side arm for thermometer. Center joint is #50 Ace-Thred). After the polymerization, HEMA grafted UHMWPE powder is removed from the suspension and washed with water and ethanol and then dried in a vacuum oven. HEMA grafted UHMWPE powder is mixed with virgin GUR1020 UHMWPE powder at different percentages (5, 10, 25, 50 wt. %). Then powder mixture is transferred to the female part of a stainless steel mold (85×50×55 mm) and the mold is assembled by placing the male part of the mold into the female part of the mold. Then, the mold is transferred between preheated platens and the sample is compression molded. The resulting molded sample is taken out of the mold.

Example 17. Grafting Hydrophilic Polymers by UV Induced Photografting onto UHMWPE Blended with Photoinitiator UHMWPE powder blended with 4-HBP is compression molded. 2-Hydroxyethyl methacrylate monomer (HEMA) is dissolved in an acetone/water (v/v, 50/50) solvent mixture and the 4-HBP blended UHMWPE is added to the medium. Then, argon is purged in order to reduce dissolved $O_2$. Then, the degassed medium and the polymeric material are irradiated by UV irradiation at room temperature for different durations. The photo-induced graft polymerization is carried out with a medium pressure, quartz, mercury-vapor UV lamp (450 W, 50 mm O.D. quartz well, 120 V).

TABLE 1

A non-comprehensive list of some photoinitiators

| Molecular formula | Chemical name | Structure | Max UV absorption | Type of initiator and chemical class |
|---|---|---|---|---|
| $C_{10}H_{12}O_2$ | 2-Hydroxy-2-methyl propiophenone | | 245 nm, 280 nm, 331 nm | Type I α-Hydroxy-ketone |
| $C_{12}H_{16}O$ | 2-Hydroxy-4'-(2-hydroxyethoxy)-2-methyl propiophenone | | 274 nm | Type I α-Hydroxy-ketone |
| $C_{13}H_{16}O_2$ | 1-Hydroxycyclohexyphenyl ketone | | 246 nm, 280 nm, 333 nm | Type II α-Hydroxy-ketone |
| $C_9H_8O_3$ | Methylbenzoyl formate | | 255 nm, 325 nm | Type I Phenylglyoxylate |
| $C_{22}H_{21}PO_2$ | Diphenyl (2,4,6-trimethylbenzoyl)-phosphine oxide | | 295 nm, 368 nm, 380 nm, 393 nm | Type I Mono Acyl Phosphine |

TABLE 1-continued

A non-comprehensive list of some photoinitiators

| Molecular formula | Chemical name | Structure | Max UV absorption | Type of initiator and chemical class |
| --- | --- | --- | --- | --- |
| $C_{26}H_{27}O_3P$ | Phosphine oxide, phenyl bis (2,4,6-trimethyl benzoyl) | | 295 nm, 370 nm | Type I Bis Acyl Phosphine |
| $C_{15}H_{21}O_2NS$ | 2-methyl-1-[4-(methylthio)phenyl]-2-(4-morpholinyl)-1-propanone | | 230 nm, 304 nm | Type I α-aminoketone |
| $C_{23}H_{30}N_2O_2$ | 2-Benzyl-2-(dimethylamino)-1-[4-(4-morpholinyl)phenyl]-1-butanone | | 233 nm, 324 nm | Type I α-aminoketone |
| $C_{24}H_{32}N_2O_2$ | 2-Dimethylamino-2-(4-methyl-benzyl)-1-(4-morpholin-4-ylphenyl)-butan-1-one | | 233 nm, 324 nm | Type I α-aminoketone |
| $C_{30}H_{22}F_4N_2Ti$ | Bis(eta 5-2,4-cylcopentadien-1-yl)-bis(2,6-difluoro-3-(1H-pyrrol-1-yl)-Phenyl)titanium | | 398 nm, 470 nm | Type I Metallocene |
| $C_{16}H_{14}OS$ | 2-isopropyl thioxanthone | | 365 nm | Type II Thioxanthone |
| $C_{16}H_{12}O_2$ | 2-Ethyl Anthraquinone | | 257 nm | Type II Anthraquinone |

TABLE 1-continued

A non-comprehensive list of some photoinitiators

| Molecular formula | Chemical name | Structure | Max UV absorption | Type of initiator and chemical class |
|---|---|---|---|---|
| $C_{17}H_{16}OS$ | 2,4-Diethyl Thioxanthone | | 365 nm | Type II Thioxanthone |
| $C_{16}H_{16}O_3$ | Benzil Dimethyl Ketal | | 250 nm, 340 nm | Type I Benzin ketal |
| $C_{13}H_{10}O$ | Benzophenone | | 251 nm | Type II Benzophenone |
| $C_{13}H_9ClO$ | 4-chloro Benzophenone | | — | Type II Benzophenone |
| $C_{15}H_{12}O_3$ | Methyl-2-benzoylbenzoate | | — | Type II Benzophenone |
| $C_{19}H_{14}O$ | 4-phenyl Benzophenone | | 289 nm | Type II Benzophenone |
| $C_{42}H_{28}Cl_2N$ | 2,2'-Bis(2-Chlorophenyl)-4,4',5,5'-Tetraphenyl-1,2'-Bi-imidazole | | 263 nm | Type I Imidazole |

TABLE 1-continued

A non-comprehensive list of some photoinitiators

| Molecular formula | Chemical name | Structure | Max UV absorption | Type of initiator and chemical class |
|---|---|---|---|---|
| $C_{44}H_{31}O_2Cl_2N_4$ | 2,2',4-tris(2-chlorophenyl)-5-(3,4-dimethoxyp-enly)-4'5'-diphenyl-1,1'-biimidazole | | — | Type I Imidazole |
| $C_{14}H_{10}Cl_2O_2$ | 4-phenoxy-2.'2'-Dichloro Acetophenone | | 289 nm | Type I Acetophenone |
| $C_{11}H_{15}NO_2$ | Ethyl-4-(dimethylamino)Benzoate | | 310 nm | Type I Tertiary Amine |
| $C_{14}H_{21}NO_2$ | Isoamyl 4-(Dimethylamino)benzoate | | 315 nm | Type I Tertiary Amine |
| $C_{17}H_{27}NO_2$ | 2-Ethyl Hexyl-4-(dimethylamino) Benzoate | | 320 nm | Type I Tertiary Amine |
| $C_{21}H_{28}N_2O$ | 4,4'Bis(diethylamino) Benzophenone (Michler's Ethyl Ketone) | | 365 nm | Type II Benzophenone |
| $C_{20}H_{16}OS$ | 4-(4'-methylphenylthio)-benzophenone | | 312 nm | Type I Benzophenone |
| $C_8H_9NO_2$ | N-Phenyl Glycine | | — | Type I Acetic acid |

TABLE 2

UHMWPE and 4-HBP powder mixture weight percentages

| | Amount of UHMWPE (g) | Amount of 4-HBP (g) |
|---|---|---|
| PE-4HBP (0.1 wt %) | 79.92 | 0.08 |
| PE-4HBP (0.25 wt %) | 79.8 | 0.2 |
| PE-4HBP (0.5 wt %) | 79.6 | 0.4 |
| PE-4HBP (0.75 wt %) | 79.4 | 0.6 |
| PE-4HBP (1.0 wt %) | 79.2 | 0.8 |

TABLE 3

UHMWPE with Vitamin-E and 4-HBP powder mixture weight percentages

| | Amount of UHMWPE with vitamin-E (g) | Amount of 4-HBP (g) |
|---|---|---|
| PE (0.1 wt % Vit. E)-4HBP (0.5 wt %) | 79.6 | 0.4 |
| PE (0.5 wt % Vit. E)-4HBP (0.5 wt %) | 79.6 | 0.4 |
| PE (1.0 wt % Vit. E)--4HBP (0.5 wt %) | 79.6 | 0.4 |
| PE (2.0 wt % Vit. E)--4HBP (0.5 wt %) | 79.6 | 0.4 |

TABLE 4

UV irradiation time of UHMWPE and 4-HBP powder mixtures with and without vitamin-E

| | UV irradiation time (min) |
|---|---|
| PE-4HBP (0.5 wt %) | 5 |
| PE-4HBP (0.5 wt %) | 15 |
| PE-4HBP (0.5 wt %) | 30 |
| PE-4HBP (0.5 wt %) | 45 |
| PE-4HBP (0.5 wt %) | 60 |
| PE (1.0 wt % Vit. E)--4HBP (0.5 wt %) | 15 |
| PE (1.0 wt % Vit E)--4HBP (0.5 wt %) | 30 |
| PE (1.0 wt % Vit. E)--4HBP (0.5 wt %) | 45 |
| PE (1.0 wt % Vit. E)--4HBP (0.5 wt %) | 60 |

What is claimed is:

1. A method of making a crosslinked polymeric material for use in a medical implant, wherein the method comprises:
   a) providing ultrahigh molecular weight polyethylene (UHMWPE);
   b) blending the UHMWPE with 4-hydroxybenzophenone and vitamin E;
   c) consolidating the UHMWPE; and
   d) photoirradiating the UHMWPE.

2. The method according to claim 1, wherein the photoirradiation is ultraviolet irradiation.

3. The method according to claim 1, wherein the photoirradiation is done when the surfaces exposed to photoirradiation are in air.

4. The method according to claim 1, wherein the photoirradaition is done when the surfaces exposed to photoirradiation are in a liquid medium.

5. The method according to claim 1, where the implant is machined before photoirradiation.

6. The method according to claim 1, where the concentration of vitamin E is 0.1 wt % to 2 wt %.

7. The method according to claim 1, where the concentration of is 4-hydroxybenzophenone is 0.01 wt % to 1 wt %.

* * * * *